Dec. 29, 1959 G. H. FRITZINGER 2,919,136

MOUNTING ARRANGEMENTS FOR SHEET RECORDS

Filed Aug. 16, 1954

INVENTOR

George H. Fritzinger 2,919,136

MOUNTING ARRANGEMENTS FOR SHEET RECORDS

George H. Fritzinger, West Orange, N.J., assignor, by mesne assignments, to McGraw-Edison Company, Elgin, Ill., a corporation of Delaware Application August 16, 1954, Serial No. 449,883

10 Claims. (Cl. 274—17)

This invention relates to machines in which flexible sheet records are mounted removably on a revolvable record support having an endless record-supporting surface, and is particularly concerned with novel arrangements for mounting sheet records in wrap-around relation to endless supporting surfaces.

The present invention is adapted especially for use with magnetic recording and reproducing machines which employ a thin, flexible sheet record coated with magnetizable particles and wrapped through substantially at least one full revolution around the record support with the leading edge thereof attached to the support to provide for drive of the sheet record therewith. In such machines a magnetic head is propelled slowly across the record support as the support is rotated so that the head scans a helical track on the sheet record with repeated crossing of the joint between the leading and trailing edges thereof. When the sheet record is removed from the support and is laid out flat, the scanning track appears as a series of side-by-side parallel lines.

It is necessary that the sheet record be placed accurately on the support so that the individual parallel lines will re-form the continuous helical track when a recorded sheet is mounted on a machine for playback or transcribing. A satisfactory means for attaching the sheet to the support comprises a pair of hooks projecting from the surface of the support to engage a pair of complementary holes in the leading edge of the sheet, as shown for example in the Roberts Patent 2,653,819, dated September 29, 1953. The hooks have the advantage that when a sheet record is placed into a definite loading position, wherein the leading edge overlies the support, the hooks will pick up the sheet automatically as the support is advanced; likewise, upon placing a stripping plate in close proximity to the support and reversely rotating the support, the sheet record is stripped from the support and disengaged automatically from the hooks.

It is an object of my invention to establish and maintain an accurate registration of sheet records with endless supporting surfaces solely by engagement of the sheet record with fastening elements projecting from the supporting surfaces and penetrating the record.

Another object is so to mount sheet records on endless supporting surfaces as to provide for drive of the sheet record in both advancing and backfeeding directions of rotation.

Another object is to provide an endless record support having a sheet-record attaching means adapted to subject the sheet record to tensioning about the record support as the sheet record is mounted.

Another object is to provide a sheet record and a record support therefor wherein the record support is provided with attaching means adapted to engage both the leading and trailing edges of the sheet record with the edges of the sheet record overlapping one another.

Another object is to provide a record-supporting surface with resiliently-mounted sheet-record fastening elements for gripping the sheet record and subjecting it to a tensioning influence.

Another object is to provide an endless record support having a series of sheet-record fastening elements spaced along the supporting surface of the support for engaging successive portions of a sheet record mounted thereon, wherein said fastening elements and record are arranged for attachment of the record in only one position on the support.

Another object is to provide for tensioning a sheet record about an endless record support as an incident of conditioning apparatus for operation on the record, and a further object is to provide for removal of said tensioning as the apparatus is put out of condition for operation.

These and other objects and features of my invention will be apparent from the following description and the appended claims.

In the description of my invention reference is had to the accompanying drawings, of which:

Figure 1:
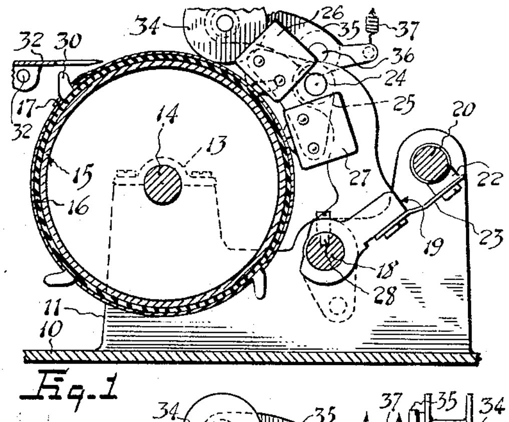
Figure 1 is a vertical section on the line 1—1 of Figure 2 fractionally showing a dictating machine embodying one form of sheet-record mounting arrangement according to my invention.
Figure 2:
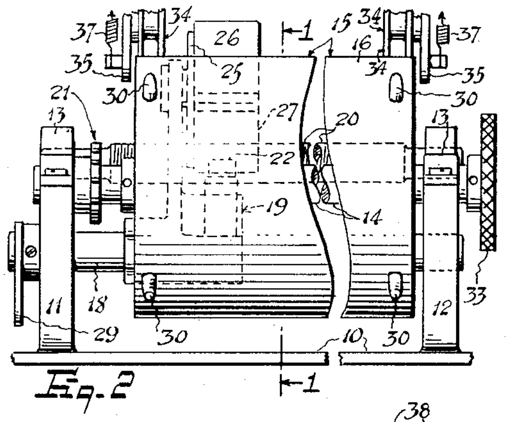
Figure 2 is a front elevation of this machine partly broken away.

The sheet-record magnetic recording and reproducing machine shown in Figures 1 and 2 may have a base 10 provided with two parallel upright standards 11 and 12. These standards have bearings 13 in which a shaft 14 is journaled. Mounted on this shaft is a record support for a sheet record having an endless supporting surface and shown, for example, as being in the form of a drum 15. The drum is provided with a yieldable peripheral covering 16, as of rubber, for providing a yieldable backing for a sheet record 17 mounted on the drum.

The standards 11 and 12 also support a transverse rod 18 on which a carriage 19 is slidably mounted for movement along the drum, and are provided with journals for a transverse feed screw 20 which is in constant drive engagement with the shaft 14 as by means of a gear train fractionally indicated at 21. A feed nut 22 is resiliently mounted on the carriage via a cantilever spring 23, and engages the feed screw 20 to cause the carriage to be propelled slowly along the drum as the drum is rotated.

Pivoted at 24 to the carriage is a rocker beam 25 carrying an erase head 26 at one end and a record-reproduce head 27 at the other end. The two heads contact the sheet record in a plane at right angles to the shaft 14 so as to ride in the same track on the record. In response to their weight and/or any desired torsional biasing of the carriage about the rod 18, the heads engage the sheet record with sufficient pressure to have firm operating contact therewith. As the drum is advanced, in a clockwise direction as it appears in the figures, the carriage is progressively moved from left to right by the feed screw, with the result that the heads scan a helical track on the sheet record running from left to right. When the sheet record is removed from the drum and laid out flat, this track appears as a series of parallel lines, as aforestated. During the mounting and removing of a sheet record onto and from the drum the heads may be disengaged by tilting the carriage 19 backwardly. Also, by so tilting the carriage the feed nut is disengaged from the feed screw to enable the carriage to be shifted manually along the drum. For the purpose of so tilting the carriage, it is splined at 28 to the rod 18, and the rod is provided with a rocker arm 29 for turning the rod as through any suitable linkage (not shown) connected thereto.

Near each end of the drum there are one or more hooks 30 which project radially outwardly with slight forward inclination relative to the direction of advance of the drum. These hooks engage corresponding holes **17*a*** in the side borders of the sheet record as the sheet record is wrapped around the drum. By way of illustration, there are four hooks 30 near each end of the drum spaced at equal intervals about the drum and grouped in pairs spaced axially along the drum. However, there are five equally spaced holes 17*a* in each side edge of the sheet record since the leading and trailing edges are desirably overlapped with one of the hooks 30 at each end of the drum engaging the holes 17*a* in both the leading and trailing corner portions of the record.

To mount a sheet record on the drum it is presented onto the drum in a loading position, as across a loading and stripping plate 32, until the holes 17*a* in the leading corners of the sheet record are substantially centered with respect to radius lines of the drum at right angles to the sheet record. Thereupon, the drum is advanced as by a knob 33 on the right end of the shaft 14 to cause a pair of the hooks to engage the holes in the leading corner portions of the sheet record, it being understood that as the drum is so advanced while the sheet record is in loading position a pair of the hooks 30 will first deflect upwardly the leading end portion of the record and then enter the holes 17*a* in the leading corners of the record by the downward deflection of the record caused by its weight and resilient tendency to resist upward deflection. Upon a pair of hooks becoming so engaged with the leading corners of the sheet record, the record is propelled from its leading edge into wrap-around relation with the drum, with engagement of successive pairs of hooks with corresponding holes 17*a* in the sheet record until the sheet record is completely wrapped on the drum with an overlap.

A feature of the present invention is in so mounting the hooks 30 that the back sides thereof with respect to the forward direction of rotation of the drum are inclined rearwardly proceeding from the tips to the base ends of the hooks and in causing these back sides of the hooks to engage the corresponding back edges of the holes **17*a*** in the record, with resultant tensioning of the sheet record, as the sheet record is wrapped onto the periphery of the drum. This tensioning may be accomplished by using sheet records of relatively tough resilient material such as of Du Pont "Mylar" polyester film and so spacing the holes 17*a* that the distances therebetween are slightly less than the circumferential spacings between successive hooks 30. As an alternative to using resilient sheet-record material, the holes 17*a* may be made oversize and spaced as before relative to the hooks so that the back sides of the hooks will engage the back edges of the holes but with resultant distortion of the holes into out-of-roundness wherefore to exert a yieldable tensioning influence on the sheet record. Since, in either case, it is necessary that the sheet record be moved down onto the periphery of the drum at each hook, I preferably provide a pressure roller 34 at each end of the drum for engaging the periphery of the drum at a point just ahead of the loading position of the sheet record. This pressure roller is preferably grooved so as to straddle the hooks, as shown. The pressure roller may, for example, be journaled to a rocker arm 35 pivoted at 36 to the frame of the machine and urged by a spring 37 to press the roller against the drum.

By engaging one of the hooks 30 at each end of the drum with both the leading and trailing corner portions of the sheet record, the sheet record is located accurately on the drum at both its leading and trailing ends without need for any auxiliary registering means. Also, the engagement of the hooks with both the leading and trailing ends of the sheet record provides for positive drive of the record with the drum in both forward and rearward direction of rotation thereof. Thus, upon rearwardly rotating the drum to strip the sheet record therefrom as by engagement of the plate 32 with the under side of the trailing edge of the sheet record, the trailing edge will be backfed positively with the drum to the plate 32 regardless of its starting point. However, to facilitate the stripping action of the plate 32, it is pivotally mounted at **32*a*** to enable it to be moved against the drum for positive engagement with the under side of the trailing edge of the sheet record.

Figures 4, 5:
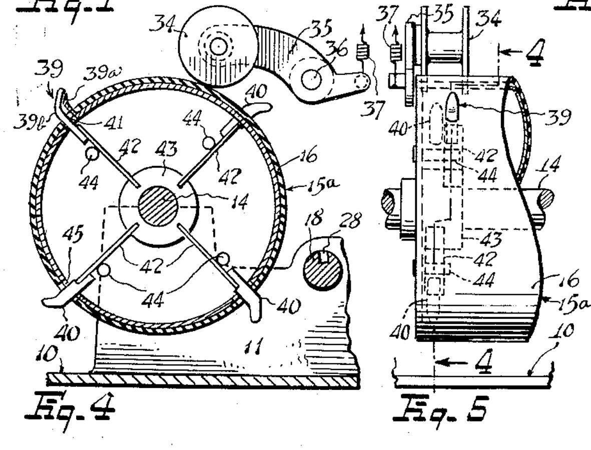
Figure 4 is a fractional section on the line 4—4 of Figure 5 illustrating a second sheet-record mounting arrangement according to my invention.
Figure 5 is a front elevation only of the left end portion of a record support according to the embodiment shown in Figure 4.
Figure 3:
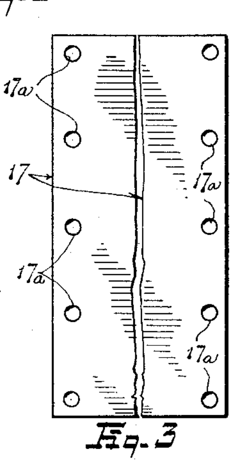
Figure 3 is a view of a sheet record, shown to reduced scale and partly broken away, for mounting on the record support of the machine shown in Figures 1 and 2.
Figure 6:
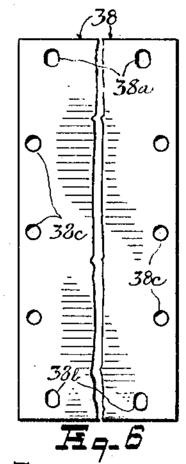
Figure 6 is a view of a sheet record, shown to reduced scale and partly broken away, for mounting on the record support shown in Figures 4 and 5.

In Figures 4 and 5 there is shown a record-supporting drum **15*a* having a different sheet-record attaching means which is adapted however to also exert a tensioning influence on the sheet record when the sheet record is mounted thereon. In this second embodiment the tensioning is accomplished by resiliently mounting the hooks on the drum. There may, for example, be again four hooks near each end of the drum comprising leading hooks 39 for engaging holes 38*a* and 38*b* in the leading and trailing corners of the sheet record, and three equally-spaced intermediate hooks 40 for engaging corresponding intermediate holes 38*c* in the sheet record. In order to start the sheet record always at the same point on the drum, the leading hooks 39 are spaced along the drum at a different distance—for example, a shorter distance as shown—than are the successive intermediate pairs of hooks, the difference in spacing being for example twice the widths of the holes in the sheet record. Likewise, the holes 38*a* and 38*b* in the sheet record are spaced at correspondingly closer distances from each other than are the intermediate holes 38*c***, as shown in Figure 6. It is to be understood, however, that this feature for registering the sheet record always in the same position circumferentially of the drum is not limited to details of this second embodiment but is applicable as well to my first embodiment above-described or to any sheet-record mounting arrangement employing a plurality of fastening elements at each side of the sheet record.

Additionally, as to the embodiment shown in Figures 4 and 5, the leading hooks 39 are split transversely into front and rearward sections **39*a* and 39*b* with respect to the forward direction of rotation of the drum but the rearward sections are shaped to overlie the front sections in the manner shown. The front section 39*a* is rigidly secured to the drum, but the rearward section 39*b* is extended through a clearance opening 41 in the peripheral wall of the drum and is resiliently mounted on a cantilever spring 42 secured at its inner end to a hub 43 of the drum. The springs 42 are biased rearwardly, relative to the direction of advance of the drum, against stops 44 to provide for the rearward sections being normally at a substantial clearance distance behind the leading sections 39*a*. The remaining hooks 40 project through respective clearance openings 45 in the drum and are each resiliently mounted, on cantilever springs 42** bearing against respective stops 44, in the manner of the mounting of the rearward sections 39b of the leading hooks 39.

When the sheet record 38 is placed into loading position and the drum is advanced clockwise as it appears in Figure 4, the hooks will move by the leading edge of the sheet record unless and until the leading hooks 39 come into engagement with the leading holes 38a in the record. To permit ready engagement of the hooks 39 with the leading holes 38a, as well as with the holes 38b in the trailing corners of the sheet record, these holes may be made slightly oversize or slightly oblong as shown. Upon advancing the drum after the leading hooks 39 have engaged the sheet record, the record will be propelled into wrap-around relation with the drum, causing the hooks 40 to engage successively the holes 38b and to cause the sheet record to be pressed down onto the periphery of the drum by the pressure roller 34. As the sheet record is engaged by the intermediate hooks 40 the back sides thereof relative to the direction of advance of the drum engage the back edges of the holes 38c to cam the hooks slightly forwardly against the force of the springs 42 to cause the sheet record to be tensioned about the drum. Likewise, as the holes 38b in the trailing corners engage the leading hooks 39 the back sides of the sections 39b engage the back edges of these holes to cam forwardly the rearward sections 39b of the leading hooks to cause the tensioning influence on the record to be extended to the trailing end thereof.

Figure 7:
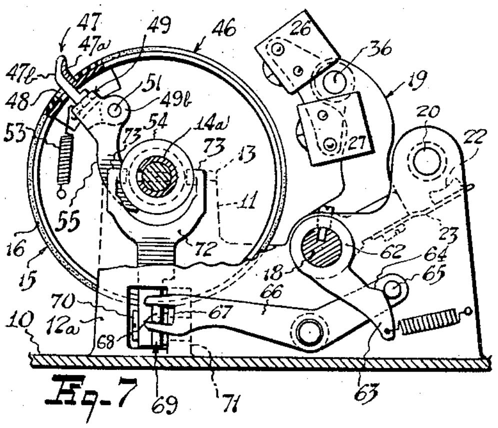
Figure 7 is a side elevation with parts in section on the line 7—7 of Figure 8, showing a dictating machine embodying a third sheet-record mounting arrangement and also novel control apparatus according to my invention.
Figure 8:
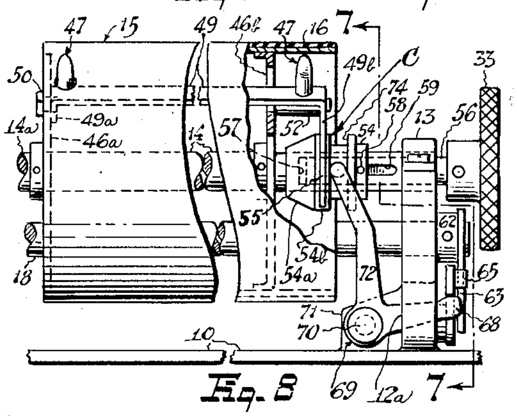
Figure 8 is a front elevation, partly broken away, of the machine shown in Figure 7.

The machine shown in Figures 7 and 8 has the same general organization as that appearing in the previous embodiments, but components which are altered are given different reference characters. This machine has a record support in the form, for example, of a drum 46 mounted on a cross shaft 14a which in turn is journaled in bearings 13 carried by the left standard 11 and a right standard 12a, the right standard being given a different reference character because of a slight alteration thereof. The drum 46 has however only one set of sheet-attaching hooks 47 which are like the leading hooks 39 of my last previous embodiment in that each hook comprises a forward section 47a and a rearward section 47b, relative to the forward direction of rotation of the drum, of which the first section is rigidly secured to the drum and the second is movably mounted and extended through a clearance opening 48 in the peripheral wall of the drum. The rearward section 47b is in this case mounted on a bail 49 which extends lengthwise of the drum internally thereof. The left arm 49a of this bail is pivoted at 50 to the left end wall 46a of the drum, and the right arm 49b of the bail is pivoted at 51 to a stud 52 (Figure 8) which extends rightwardly from an inset end wall 46b of the drum. A tension spring 53 connected between the bail and a pin on the end wall 46b serves to bias rearwardly the back sections 47b of the hook 47. The hooks may however be closed against the force of the tension spring by a cam mechanism C herein next described.

This cam mechanism comprises a collar 54 slidably mounted on the shaft 14a at the right end of the drum. This collar has a frusto-conical cam surface 54a at the left end thereof. When the collar is in its innermost position shown in Figure 8 an extending finger 55 of the right arm 49b of the bail engages the shoulder 54b to hold the hook sections closed. As the collar is shifted rightwardly the finger 55 rides off the shoulder 54b and down the cam surface 54a to cause the rearward hook section 47b to move back from the forward section 47a under influence of the tension spring 53.

The collar 54 is shifted by means of the knob 33 at the end of the shaft 14a. For this reason the knob 33 is mounted on a rod 56 separate from the shaft 14a but slidably mounted in an axial bore 57 provided in the right end portion of the shaft. The collar 54 is both splined to the shaft 14a and connected to the rod 56 by means of a pin 58 extending through a slot 59 in the shaft 14a and staked to the rod. Thus, the knob 33 is connected to the shaft 14 for rotating the drum and is connected to the collar 54 for opening and closing the hooks, the latter control function being so arranged that the hooks are closed and opened respectively as the knob is moved inwardly and outwardly.

Figure 9:
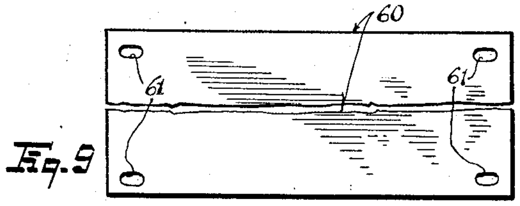
Figure 9 is a view of a sheet record, shown to reduced scale and partly broken away, for mounting on the record support of the machine illustrated in Figures 7 and 8.

The hooks are to be closed during mounting of a sheet record 60 (Figure 9) onto the drum, and after the mounting of the sheet record in wrap-around relation with the drum they are to be opened to accurately locate both the forward and rearward ends of the sheet record on the drum and also to tension the sheet record about the drum. For this purpose the sheet record has identical holes 61 in corner portions thereof. These holes may be made round and be oversize relative to the hooks 47, but preferably they are made oblong for more accurate location of the sheet record in directions axially of the drum.

In order to mount the sheet record the knob 33 is pressed inwardly to close the hooks 47, the sheet record is placed in loading position and then the drum is advanced in a clockwise direction by the knob 33 to cause the hooks first to engage the holes in the leading edge of the sheet record and secondly to propel the sheet record in wrap-around relation to the drum by engagement of the forward sections 47a of the hooks with the leading edges of the holes 61 in the forward corner portions of the sheet record. When the sheet record is completely wrapped through one revolution onto the periphery of the drum, with the trailing edge thereof overlapping the leading edge and lying flat against the periphery of the drum, the operator pulls the knob 33 outwardly to release the rearward hook sections so that they will move counterclockwise under influence of the tension spring 53. As the rearward sections are so released they exert pressure against the trailing edges of the holes in the trailing corners of the sheet record, while the leading hook sections continue to exert pressure against the leading edges of the holes in the forward corner portions of the sheet record, whereby to tension the sheet record around the drum. Since the hook sections have a firm and close engagement with both the leading and trailing corners of the sheet record they accurately locate the record in directions axially of the drum and they retain the record under tension without dependence on using any resilient sheet-record material and without requiring critical dimensioning of the sheet record; still further, they positively grip the sheet record at both its leading and trailing ends to provide for drive of the record with the drum in both forward and rearward direction of rotation thereof.

It is necessary that the hooks be closed while a record is not only mounted on but also when it is removed from the drum, and it is also desirable to have both of the heads 26 and 27 disengaged from the drum at such times. In order that the engagement of the heads with the drum may also be controlled by the knob 33, a coupling is provided from the knob to the heads. This coupling comprises a collar 62 pinned to the right end of the rod 18 on which the carriage 19 is slidably mounted. Depending from this collar is a finger 63 at the back side of which there is a cam 64. Coacting with this cam is a pin 65 carried at the back end of a forwardly-extending lever 66 pivoted at its central portion to the right side of the standard 12a. The forward end of this lever 66 terminates in a fork 67 which engages the outer end of a horizontal arm 68 of a transversely-positioned bell crank 69. This bell crank is pivoted at 70 to a short standard 71 on the base plate 10 and has an upstanding arm 72 which is forked at its upper end portion. This forked portion is provided with diametrically-opposite and inwardly-extending trunnions 73 (Figure 7) which slidably engage a peripheral groove 74 in the collar 54.

When the knob 33 is pressed inwardly to close the hooks 47 in preparation for mounting or removing a record onto or from the drum, the bell crank 69 is turned counterclockwise (Figure 8), the lever 66 is turned clockwise (Figure 7) and the pin 65 is moved onto the crest of the cam 64 to turn the carriage support rod 18 clockwise and to thereby lift the heads 26 and 27 from the drum. Vice versa, when the knob 33 is pulled outwardly, the pin 65 is moved off the crest of the cam 64 and the heads 26 and 27 are turned into engagement with the record on the drum in response to the biasing provided to urge them against the drum.

The embodiments of my invention herein particularly shown and described are intended to be illustrative and not limitative of my invention since the same is subject to changes and modifications without departure from the scope of my invention, which I endeavor to express according to the following claims.

I claim:

1. In a dictation machine: the combination of a flexible and substantially rectangular sheet record; a revolvable record support having an endless peripheral surface for carrying said sheet record in the form of a closed loop with overlap of its trailing and leading edges; and sheet-record fastening means providing for drive of the sheet record with the support in both forward and rearward directions of rotation, said fastening means comprising fastening elements near the respective ends of said support spaced from each other axially of the support, and leading and trailing corner elements at each side of the sheet record each interengageable with and separable from the respective fastening element on said support by relative movement toward and away from the support, the back sides of said fastening elements having inclined faces for engaging the trailing corner portions of the sheet record to shift said corner portions circumferentially of said support with tensioning of the sheet record about said support as the trailing corner portions are pressed into engagement with said fastening elements; and means for pressing said corner portions onto said fastening elements.

2. In a dictation machine: the combination of a flexible sheet record; a revolvable record support having an endless peripheral surface for carrying said sheet record in wrap-around relation thereto and with overlap of the leading and trailing edges, said sheet record having an apertured portion at each corner thereof so positioned that the apertures at each side of the sheet record are in at least partial alignment with each other when the sheet record is wrapped on said support; and a fastening means at each end of said support projecting through said aligned holes for releasably holding the leading and trailing corners of the sheet record to said support to provide for drive of the sheet record with the support in both forward and rearward directions of rotation, each of said fastening means having an inclined back side for slidably engaging the back edge of the aperture in the respective trailing corner of the sheet record to cause the trailing corners to be cammed circumferentially of said support as the trailing corners are pressed onto said fastening means; and means for pressing said corner portions onto said fastening means.

3. In a dictation machine: the combination of a flexible sheet record; a revolvable record support having an endless peripheral surface for carrying said sheet record with the leading edge secured thereto, said sheet record having an aperture in each trailing corner portion thereof; a projecting fastening element at each end of said support for engaging the respective aperture in the corner portion of the sheet record, said fastening elements having back sides inclined forwardly with respect to the direction of forward rotation of said support for engaging the back edges of the apertures in the trailing corner portions of the sheet record to cam said corner portions circumferentially with tensioning of the sheet record about said support as the trailing corner portions are pressed onto said fastening elements; and pressure means engaging the periphery of said record support for pressing the sheet record onto said fastening elements with resultant tensioning of the record as the record is wrapped onto the support.

4. The combination set forth in claim 3 including a series of said fastening elements on said support spaced at intervals along each end of said support, each of said fastening elements having a rearwardly-inclined back side, and said sheet record having a series of holes along each side thereof spaced for successive engagement with said series of fastening elements, with the back edges of said holes engaging the inclined back sides of said fastening elements to provide for tensioning of successive portions of the sheet record about said support as the sheet record is wrapped onto the periphery of the support.

5. In a dictation machine: the combination of a flexible sheet record; a revolvable record support having an endless peripheral surface for carrying said sheet record with the leading edge secured thereto, said sheet record having an aperture in each trailing corner portion thereof; means for rotating said support in a forward direction; a fastening element at each end of said support for engaging the aperture in the respective trailing corner portion of the sheet record, each fastening element having a forwardly-inclined back side relative to the direction of forward movement of the record support for engaging the back edge of the respective aperture in the sheet record to cam the respective portion circumferentially of said support with tensioning of the sheet record about said support as the trailing corner portion of the sheet record is pressed onto the fastening element; and pressure rollers engaging the peripheral surface of said support on circumferential lines adjacent to said fastening elements for pressing said trailing corner portions of the sheet record onto said fastening elements as the support is rotated in a forward direction.

6. In a dictation machine: the combination of a flexible sheet record; a revolvable record support for carrying said sheet record in the form of a closed loop, said sheet record having a series of holes along each side and said support having a series of projecting fastening elements near each end spaced at intervals about the support for successively engaging said holes as the sheet record is wrapped onto said support, the distance transversely of the sheet record between the holes in the leading portion thereof being different from the distance transversely of the sheet between the holes in successive portions of the sheet record, one pair of said fastening elements on said support being correspondingly differently spaced from the spacing of the other pairs of said elements to provide for attachment of the leading edge of the sheet record to said support at only one point on the support, said fastening elements having inclined back portions spring mounted on said support for slidably engaging the back edges of the respective holes in the sheet record with a camming action to cause the sheet record to be tensioned circumferentially of said support as the sheet record is pressed onto said fastening elements, and means for pressing the sheet record onto said fastening elements.

7. The combination set forth in claim 6 wherein said sheet record has sufficient length to extend once around said support with overlap of its leading and trailing edges, and wherein the trailing edge of the sheet record has a pair of holes in at least partial alignment with the holes in the leading edge and engaged also by said one pair of fastening elements when the sheet record is so wrapped onto said support.

8. A dictation machine comprising a flexible sheet record; a revolvable record support having an endless peripheral surface for carrying said sheet record in wrap-around relation thereto, said sheet record having holes in the leading and trailing portions thereof; projecting fastening elements rigidly mounted on said support for engaging the holes in the leading portion of the sheet record to provide for drive of the sheet record with the support; other projecting fastening elements on said support mounted for shifting movement circumferentially of said support and positioned for engagement with the holes in the trailing portion of the sheet record; means biasing said other projecting elements rearwardly with respect to the forward direction of rotation of the record support for tensioning a mounted record about said support; means operable to condition the machine for operation on a mounted record; and means coupling said conditioning means to said shiftable fastening elements for shifting the elements into forward positions relative to said support when the machine is out of condition for operation and for releasing the shiftable elements to place them under influence of said biasing means when the machine is conditioned for operation.

9. A dictation machine comprising a flexible sheet record; a revolvable record support having an endless peripheral surface for carrying said sheet record in wrap-around relation thereto, said sheet record having holes in the leading and trailing portions thereof; projecting fastening elements rigidly mounted on said support for engaging the holes in the leading portion of the sheet record to provide for drive of the sheet record with the support as the support is rotated in a forward direction; other projecting fastening elements on said support mounted for shifting movement circumferentially of said support and positioned for engagement with the holes in the trailing portion of the sheet record; means biasing said other projecting elements rearwardly with respect to the forward direction of rotation of said support for tensioning a mounted record about said support; a record-engageable translating device; a carriage for said device including means shiftable to move said device into and out of engagement with a sheet record on said support; and means coupling said shiftable means to said shiftable fastening elements for placing the shiftable fastening elements into forward positions relative to said support when said translating device is disengaged from the record and for placing the shiftable fastening elements under influence of said biasing means when said translating means is engaged with the record.

10. In a dictation machine: the combination of a flexible sheet record; a revolvable record support having an endless peripheral surface for carrying said sheet record in wrap-around relation thereto; projecting fastening elements on said support at opposite sides of said peripheral surface and spaced at intervals about said support for engaging corresponding holes in the side edges of the sheet record to provide for drive of the sheet record with the support as the support is rotated in forward and rearward directions, one pair of said fastening elements comprising transversely-sectioned teeth the forward sections of which are rigidly secured to said support for driving the sheet record from its leading edge as the support is rotated in a forward direction and the rearward sections of which are movably mounted on said support and spring-urged rearwardly; and means movably mounting the remaining ones of said fastening elements on said support and spring-urging the same rearwardly with respect to the direction of forward rotation of the support, the back sides of said fastening elements being inclined rearwardly for sliding engagement with the back edges of the corresponding holes in the sheet record, with tensioning of the sheet record from its leading edge, as the sheet record is wrapped onto the periphery of said support.

References Cited in the file of this patent

UNITED STATES PATENTS

| | | |
|---|---|---|
| 967,079 | Stipe | Aug. 9, 1910 |
| 2,051,511 | Finch | Aug. 18, 1936 |
| 2,157,621 | Neilson | May 9, 1939 |
| 2,435,260 | Wise et al. | Feb. 3, 1948 |
| 2,653,819 | Roberts | Sept. 29, 1953 |
| 2,729,453 | Camras | Jan. 3, 1956 |
| 2,745,904 | Bobb | May 15, 1956 |

FOREIGN PATENTS

| | | |
|---|---|---|
| 876,776 | Germany | May 18, 1953 |
| 692,661 | Great Britain | June 10, 1953 |
| 970,077 | France | June 7, 1950 |